United States Patent Office 3,796,742
Patented Mar. 12, 1974

3,796,742
PROCESS FOR PREPARING CYCLOALKENONE ESTERS
Peter Oberhansli, Zurich, Switzerland, assignor to Givaudan Corporation, Clifton, N.J.
No Drawing. Filed Aug. 10, 1972, Ser. No. 279,598
Claims priority, application Switzerland, Aug. 20, 1971, 12,247/71
Int. Cl. C07c 69/74
U.S. Cl. 260—468 K                    6 Claims

ABSTRACT OF THE DISCLOSURE

A novel process for making cycloalkenones useful as intermediates for jasmine-like fragrances, is disclosed.

FIELD OF THE INVENTION

This invention relates to the field of fragrances.

DESCRIPTION OF THE PRIOR ART

A number of synthetic and naturally-occurring substances useful as fragrances having jasmine-like odors is known.

SUMMARY OF THE INVENTION

The present invention is concerned with a process for the manufacture of cycloalkenone esters, useful as intermediates for making fragrances of the jasmine type.

The cycloalkenone esters obtained according to the present invention have the following general formula

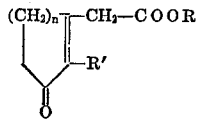

(I)

in which R represents a lower alkyl group, R' represents a lower 2-alkenyl or 2-alkynyl group and $n$ stands for 1 or 2.

According to the present invention, the cycloalkenone esters of Formula I hereinabove are manufactured by reacting a compound of the general formula

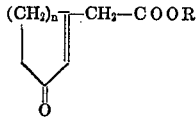

(II)

in which R and $n$ have the significance given earlier, with a 2-alkenyl or 2-alkynyl chloride, bromide, iodide or sulphonate in a solvent in the presence of a base.

DESCRIPTION OF THE PREFERRED EMBODIMENTS

The term "lower" as used in this description and in the accompanying claims in respect of alkenyl and alkynyl groups refers especially to groups containing up to 8 carbon atoms. These groups can be straight-chain or branched-chain. Examples of lower 2-alkenyl groups are allyl, methallyl, prenyl and 2-pentenyl. Examples of lower 2-alkynyl groups are propargyl and 2-pentynyl. Examples of sulphonates are tosylates and mesylates.

On practical grounds, the lower alkyl groups denoted by the symbol R expediently contain 1–4 carbon atoms.

The process provided by the present invention surprisingly proceeds in a substantially selective manner. It was to be expected that the methylene group in the side-chain would display a similar reactivity to position 2 in the ring and, in fact, alkylation with alkyl halides (e.g. pentyl chloride) yields a mixture of starting material, two probably monoalkylated products and a probably dialkylated product. In contrast to this, the desired product is obtained, for example in an alkylation with cis-2-pentenyl chloride, in about 90% yield.

The reaction conditions for the present process can be varied within wide limits. As the solvent there can be used, for example, an aromatic hydrocarbon such as benzene or toluene, an aliphatic hydrocarbon such as petroleum ether, an ether such as dioxan or tetrahydrofuran, or an alcohol such as methanol or ethanol. Examples of bases which can be used are alkali metal and alkaline earth metal hydroxides and carbonates such as sodium and potassium hydroxide or carbonate. Organic bases such as sodium methylate or ethylate can also be used.

Preferred starting materials of Formula II are those in which R represents an alkyl group containing up to 4 carbon atoms, especially the methyl group, and $n$ stands for 1.

In carrying out the reaction, the reaction mixture is expediently heated to boiling temperature and the conversion is determined by withdrawing samples and submitting them to gas chromatographic analysis.

The cycloalkenone esters of Formula I are of value as intermediates for the preparation of odorants of the jasmine series. The esters may be converted to such odorants by reduction with lithium in ammonia in known manner. For example, [2-cis-2'-pentenyl-3-keto-1-cyclopentenyl]-acetic acid methyl ester when reduced with lithium in ammonium is converted into methyl jasmonate.

Those skilled in the art of perfumery will know the manner of using the resulting odorants because methyl jasmonate is a well known odorant and the odorants made from the other esters of Formula I by reduction with lithium in ammonia are useful as olfactory variants of methyl jasmonate and may be used in substantially the same manner as the latter for their fragrance properties. Also, the fragrance compounder or perfumer may employ the resulting odorants in any desired amounts to achieve special olfactory effects.

The following examples illustrate the invention without being limitative thereof.

Example 1

A mixture of 31.2 g. of [3-keto-1-cyclopentenyl]-acetic acid methyl ester, 22.0 g. of cis-2-pentenyl chloride and 76.0 g. of anhydrous potassium carbonate in 480 ml. of dry benzene was boiled at reflux for 42 hours with stirring under nitrogen and with the exclusion of moisture. Samples were withdrawn after 1, 17.5, 26 and 42 hours by filtering an aliquot of the reaction solution through wadding and concentrating the filtrate. A portion of this residue was injected into a gas chromatograph. After 42 hours, the reaction was practically complete. The mixture was cooled and filtered. Evaporation of the filtrate and distillation of the residue (44.9 g. of a reddish oil) yielded 41.8 g. (93%) of [2-cis-2'-pentenyl-3-keto-1-cyclopentenyl]-acetic acid methyl ester of boiling point 108°–127° C./0.02 mm.; gas chromatographically determined purity: 92%.

Substantially the same results may be obtained when an equivalent amount of 2-pentenyl bromide, -iodide or -sulfonate is used in place of the cis-2-pentenyl chloride.

When an equivalent amount of 2-pentenyl -bromide, -iodide or -sulfonate is substituted for the 2-pentenyl chloride, there is obtained 2-(2'-pentenyl)-3-keto-1-cyclopentenyl-acetic acid methyl ester.

Example 2

A mixture of 3.12 g. of [3 keto-1-cyclopentenyl]-acetic acid methyl ester, 2.8 g. of 3-methyl-2-butenyl chloride and 7.6 g. of anhydrous potassium carbonate in 48 ml. of dry toluene was boiled at reflux for 35 hours with stirring under a nitrogen atmosphere and with the exclusion of moisture. The mixture was then cooled and filtered. Evaporation of the filtrate and distillation of the residue gave 2.9 g. (68%) of [2-(3'-methyl-2'-butenyl)-3-keto-1-cyclopentenyl]-acetic acid methyl ester of boiling point 95°–100° C./0.03 mm. (air bath); gas chromatographically determined purity: 90%.

Substantially the same results may be obtained when an equivalent amount of 3-methyl-2-butenyl bromide, -iodide or -sulfonate is used in place of the 3-methyl-2-butenyl chloride.

Example 3

In analogy to Example 1, 1.56 g. of [3-keto-1-cyclopentyl]-acetic acid methyl ester, 1.53 g. of 2-pentynyl bromide and 3.8 g. of anhydrous potassium carbonate were reacted in 24 ml. of benzene to give [2-(2'-pentynyl)-3-keto-1-cyclopentenyl]-acidic acid methyl ester of boiling point 130–140°/0.02 mm. (air bath).

What is claimed is:

1. A process for the manufacture of cycloalkenone esters of the general formula

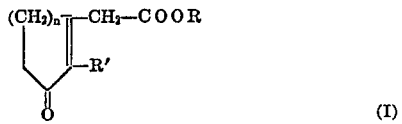

(I)

in which R represents a lower alkyl group, R' represents a lower 2-alkenyl or 2-alkynyl group and $n$ stands for 1 or 2, which process comprises reacting a compound of the general formula

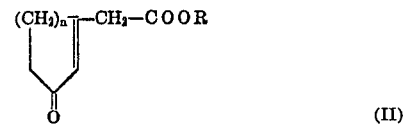

(II)

in which R and $n$ have the significance given earlier in this claim, with a 2-alkenyl or 2-alkynyl chloride, bromide, iodide or sulphonate in a solvent in the presence of a base.

2. A process according to claim 1, wherein a compound of Formula II is reacted with 2-pentenyl chloride, bromide, iodide or sulphonate.

3. A process according to claim 1, wherein a compound of Formula II is reacted with 2-pentynyl chloride, bromide, iodide or sulphonate.

4. A process according to claim 1, wherein a compound of Formula II is reacted with cis-2-pentenyl chloride or bromide.

5. A process according to claim 1, wherein a compound of Formula II is reacted with 3-methyl-2-butenyl chloride, bromide or sulphonate.

6. A process according to claim 1, wherein a compound of Formula II in which $n$ stands for 1 is used.

References Cited

J. March, Adv. Organic Chem.: Reactions, Mechanisms and Structures, pp. 357–360.

LORRAINE A. WEINBERGER, Primary Examiner

P. J. KILLOS, Assistant Examiner

U.S. Cl. X.R.

252—522